US012502796B2

(12) United States Patent
Braun et al.

(10) Patent No.: US 12,502,796 B2
(45) Date of Patent: Dec. 23, 2025

(54) HAIR CLIPPER WITH BLADE ASSEMBLY HAVING ENTRAPPED SPRING

(71) Applicant: Andis Company, Sturtevant, WI (US)

(72) Inventors: Christopher J. Braun, Racine, WI (US); Joseph Novak, Milwaukee, WI (US); Jeffrey D. Gross, Kenosha, WI (US); Jassen R. Miller, Trevor, WI (US)

(73) Assignee: Andis Company, Sturtevant, WI (US)

(*) Notice: Subject to any disclaimer, the term of this patent is extended or adjusted under 35 U.S.C. 154(b) by 496 days.

(21) Appl. No.: 17/520,064

(22) Filed: Nov. 5, 2021

(65) Prior Publication Data

US 2022/0055236 A1 Feb. 24, 2022

Related U.S. Application Data

(63) Continuation-in-part of application No. 17/407,954, filed on Aug. 20, 2021, which is a
(Continued)

(51) Int. Cl.

| | |
|---|---|
| ***B26B 19/06*** | (2006.01) |
| ***B26B 19/20*** | (2006.01) |
| ***B26B 19/38*** | (2006.01) |

(52) U.S. Cl.

CPC .......... *B26B 19/06* (2013.01); *B26B 19/3846* (2013.01); *B26B 19/20* (2013.01); *B26B 19/3853* (2013.01)

(58) Field of Classification Search

CPC ..... B26B 19/02; B26B 19/04; B26B 19/3846; B26B 19/06; B26B 19/3853;
(Continued)

(56) References Cited

U.S. PATENT DOCUMENTS

| | | | |
|---|---|---|---|
| 3,090,119 | A | 5/1963 | Jepson |
| 3,237,304 | A | 3/1966 | Merzon |

(Continued)

FOREIGN PATENT DOCUMENTS

| | | |
|---|---|---|
| AU | 202015773 | 1/2021 |
| AU | 202110365 | 3/2021 |

(Continued)

OTHER PUBLICATIONS

U.S. Appl. No. 29/735,659, filed May 22, 2020, Andis Company.
(Continued)

*Primary Examiner* — Adam J Eiseman
*Assistant Examiner* — Robert D Cornett
(74) *Attorney, Agent, or Firm* — Reinhart Boerner Van Deuren s.c.

(57) ABSTRACT

A hair cutter with an improved blade assembly is described. The blade assembly includes a first blade, a second blade, a yoke coupled to the second blade, a blade guide between the first and second blade, a retainer, and a biasing mechanism. The biasing mechanism includes a base and at least one arm configured to interface with and move with the second blade. The retainer is positioned behind the second blade and engages the biasing mechanism. The retainer is further configure to receive a housing connector, allowing for coupling to a handle of the hair cutter.

21 Claims, 20 Drawing Sheets

Related U.S. Application Data continuation-in-part of application No. 29/756,803, filed on Oct. 30, 2020, now Pat. No. Des. 993,535, and a continuation-in-part of application No. 29/735,659, filed on May 22, 2020, now Pat. No. Des. 972,215.

(58) Field of Classification Search
CPC . B26B 19/3886; B26B 19/205; B26B 19/386; B26B 19/20
USPC ... 30/208, 43, 198, 212, 213, 537, 43.92, 51
See application file for complete search history.

(56) References Cited

U.S. PATENT DOCUMENTS

| | | | | |
|---|---|---|---|---|
| 3,992,778 | A * | 11/1976 | Urbush | B26B 19/06 30/220 |
| 5,383,273 | A | 1/1995 | Muller | |
| D387,487 | S | 12/1997 | Sulik | |
| 6,141,875 | A | 11/2000 | Andrews | |
| D811,659 | S | 2/2018 | Anwar | |
| D910,918 | S | 2/2021 | Jiang | |
| D965,894 | S | 10/2022 | Werner | |
| D972,215 | S | 12/2022 | Braun | |
| D972,779 | S | 12/2022 | Wang | |
| 11,577,415 | B2 | 2/2023 | Davignon | |
| D980,531 | S | 3/2023 | Colpitts | |
| D993,535 | S | 7/2023 | Braun | |
| D1,005,590 | S | 11/2023 | Zhang | |
| D1,008,556 | S | 12/2023 | Lou | |
| D1,011,621 | S | 1/2024 | Lv | |
| D1,032,094 | S | 6/2024 | de Gouzillon de Belizal | |
| D1,041,755 | S | 9/2024 | Tehrani | |
| D1,055,387 | S | 12/2024 | Sterzi | |
| D1,074,057 | S | 5/2025 | Lai | |
| 2002/0092178 | A1 * | 7/2002 | Fung | B26B 19/063 30/223 |
| 2004/0103545 | A1 | 6/2004 | Dansreau | |
| 2016/0075039 | A1 * | 3/2016 | Werner | B26B 19/06 30/200 |
| 2017/0355089 | A1 | 12/2017 | Han et al. | |
| 2018/0126570 | A1 | 5/2018 | Werner | |
| 2020/0055205 | A1 * | 2/2020 | Werner | B26B 19/06 |
| 2020/0316795 | A1 | 10/2020 | Rodriguez | |
| 2021/0086377 | A1 * | 3/2021 | Johnson | B26B 19/20 |
| 2025/0058485 | A1 | 2/2025 | Zendek | |

FOREIGN PATENT DOCUMENTS

| | | |
|---|---|---|
| AU | 202111523 | 5/2021 |
| AU | 202111855 | 6/2021 |
| AU | 202112675 | 8/2021 |
| CN | 202030681637.8 | 5/2021 |
| EM | 008211825-0001 | 11/2020 |
| EM | 008211825-0002 | 11/2020 |
| EM | 008211825-0003 | 11/2020 |
| EM | 008211825-0004 | 11/2020 |
| EM | 008211825-0005 | 11/2020 |
| GB | 90082118250001 | 11/2020 |
| GB | 90082118250002 | 11/2020 |
| GB | 90082118250003 | 11/2020 |
| GB | 90082118250004 | 11/2020 |
| GB | 90082118250005 | 11/2020 |

OTHER PUBLICATIONS

U.S. Appl. No. 29/756,803, filed Oct. 30, 2020, Andis Company.
Andis 74150 GTX-EXO Professional Cord/Cordless Lithium-ion Electric Beard & Hair Trimmer, reviewed as early as Jun. 10, 2024, retrieved from: https://www.amazon.com/Andis-74150-Professional-Cordless-Lithium-ion/dp/B0BZTGL6LG/ref=sr_1_15?crid=2L0KT1TQKSNHK&dib=eyJ2ljoiMSJ9.SI918LqW3SVQsKp2t_yOHpnugy6dEYB_QXNUNWdW2Z2GH.

* cited by examiner

HAIR CLIPPER WITH BLADE ASSEMBLY HAVING ENTRAPPED SPRING

CROSS-REFERENCE TO RELATED PATENT APPLICATION

This application is a Continuation-in-Part of U.S. application Ser. No. 17/407,954, filed Aug. 20, 2021, which is a Continuation-in-Part of U.S. Design application Ser. No. 29/735,659, filed May 22, 2020, and U.S. Design application Ser. No. 29/756,803, filed Oct. 30, 2020, which are incorporated herein by reference in their entirety.

BACKGROUND OF THE INVENTION

The present invention relates generally to the field of hair cutters or clippers. The present invention relates specifically to hair cutters or clippers with a modified housing.

SUMMARY OF THE INVENTION

One embodiment of the invention relates to a blade assembly including a stationary blade having teeth extending along a front portion of the stationary blade and a cutting blade having cutting teeth extending along an edge parallel to the front portion of the stationary blade. The cutting blade supported relative to the stationary blade such that the cutting teeth are moveable over the stationary blade to cut hair. The blade assembly including a yoke coupled to the cutting blade and a blade guide at least partially positioned between the stationary blade and the cutting blade. The blade assembly including a biasing member. The biasing member including a plurality of free ends that interface against the yoke and a plurality of angled biasing arms extending from the plurality of free ends. The biasing member further including a plurality of fixed ends extending from the plurality of angled biasing arms and a plurality of securing arms extending from each of the fixed ends and a base extending between the plurality of securing arms. The blade assembly including a retainer positioned behind the cutting blade and coupled to the stationary blade and engaged by the plurality of biasing members such that the base of the biasing member is trapped against the stationary blade.

Another embodiment of the invention relates to a blade assembly including a lower blade having teeth extending along a front portion of the lower blade and an upper blade having cutting teeth extending along an edge parallel to the front portion of the lower blade. The upper blade supported relative to the lower blade such that the cutting teeth are moveable over the lower blade to cut hair. The blade assembly including a yoke coupled to the upper blade and a blade guide at least partially positioned between the lower blade and the upper blade. The blade assembly including a plurality of springs. Each spring includes a plurality of free ends that interface against the yoke and a plurality of angled spring arms extending from the plurality of free ends. Each spring further including a plurality of fixed ends extending from the plurality of angled spring arms and a plurality of securing arms extending from each of the fixed ends and a spring base extending between the plurality of securing arms. The blade assembly including a retainer positioned behind the upper blade and coupled to the lower blade and engaged by the plurality of springs such that the spring bases of the plurality of springs are trapped against the lower blade.

Another embodiment of the invention relates to a blade assembly including a lower blade having teeth extending along a front portion of the lower blade and an upper blade having cutting teeth extending along an upper blade edge parallel to the front portion of the lower blade. The upper blade supported relative to the lower blade such that the cutting teeth are moveable over the lower blade to cut hair. The blade assembly including a yoke coupled to the upper blade and a blade guide at least partially positioned between the lower blade and the upper blade. The blade assembly including a plurality of springs. Each spring includes two free ends that interface against the yoke and two angled spring arms extending from the two free ends. Each spring further including two fixed ends extending from the two angled spring arms and two securing arms extending from the two fixed ends and a spring base extending between the two securing arms. The blade assembly including a retainer positioned behind the upper blade and coupled to the lower blade and engaged by the plurality of springs such that the spring bases of the plurality of springs are trapped against the lower blade.

One embodiment of the invention relates to a cutter having a blade assembly and a handle. The blade assembly defines a cutting end with a stationary blade and an oscillating blade that oscillates cutting teeth over the stationary blade to cut hair. The handle has an upper housing and a lower housing, each having an outer surface including a gripping portion that align and together define a grip. The handle further includes a gripping end opposing the cutting end and a neck having a generally concave shape and configured to deflect cut hair away from the cutter. The lower housing couples to the upper housing to define a first housing width at the gripping end and a second housing width at the cutting end. The second housing width is greater than the first housing width. The grip includes a plurality of ridges extending around a portion of the handle and positioned between the cutting end and the gripping end.

Another embodiment of the invention relates to a hair cutter having a blade assembly and a handle. The blade assembly defines a cutting end with a stationary blade and an oscillating blade that oscillates cutting teeth over the stationary blade to cut hair. The handle has an upper housing and a lower housing, each having an outer surface including a gripping portion that align and together define a grip. The handle further includes a gripping end opposing the cutting end and a neck having a shape and configured to deflect cut hair away from the hair cutter. The grip includes a plurality of ridges extending around a portion of the handle and positioned between the cutting end and the gripping end. The grip includes a plurality of ridges extending around a portion of the handle and positioned between the cutting end and the gripping end.

Another embodiment of the invention relates to a cutter having a blade assembly and a handle. The blade assembly defines a first end with a stationary blade and an oscillating blade that oscillates cutting teeth over the stationary blade to cut hair. The handle has an upper housing and a lower housing, each having an outer surface including a gripping portion that align and together define a grip. The handle further includes a second end opposing the first end and a neck having a shape and configured to deflect cut hair away from the cutter. The lower housing couples to the upper housing to define a first housing width at the second end and a second housing width at the first end. The second housing width is greater than the first housing width. The upper housing further includes a top side and the lower housing further includes a bottom side. The grip includes a plurality of ridges spaced apart and extending around the handle reaching the bottom side and positioned between the first and second end of the cutter.

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Referring generally to the figures, various embodiments of a hair trimmer, cutter, or clipper shown as a hair clipper are shown. As discussed herein, Applicant has developed a number of improvements to the housing of the hair clipper. In one embodiment, the hair clipper includes a handle with an upper housing and a lower housing and a blade assembly. The hair clipper includes a shape defined by a greater width at a cutting end adjacent to the blade assembly than a width at the gripping end that opposes the cutting end. The upper and lower housing each include a gripping portion that together defines a grip. The location of the grip and size relative to the handle allows for improved grasping for users.

In another embodiment, an improved neck portion is coupled to the upper housing at the cutting end and extending toward the blade assembly. The neck portion includes a shape configured to prevent cut hair or other debris from entering or interfering with internal components of the hair clipper. In a specific embodiment, the neck includes a concave shape to deflect away the hair or other debris. The shape and size of the neck relative to the handle allows for reduced weight compared to a standard hair shield that may extend across the width of the handle.

In another embodiment, an improved blade assembly for a hair cutter, clipper or trimmer is described. The blade assembly includes entrapped biasing members, shown as springs that allow for reciprocating motion of the upper blade and yoke with respect to the lower blade. The entrapped springs hold the upper and lower blades in an operational position.

Figure 1:
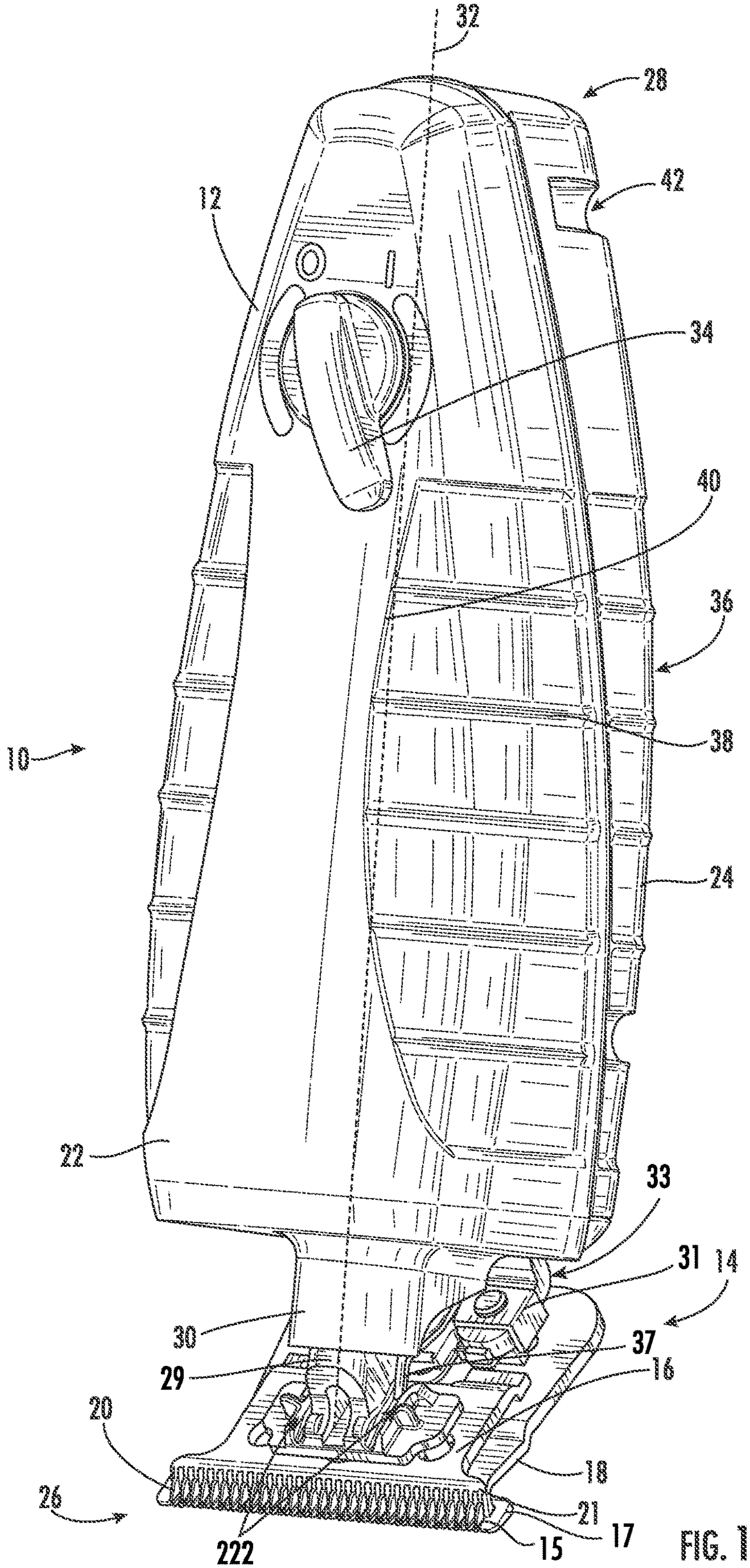
FIG. 1 is a front perspective view of a hair clipper, according to an exemplary embodiment.
Figure 2:
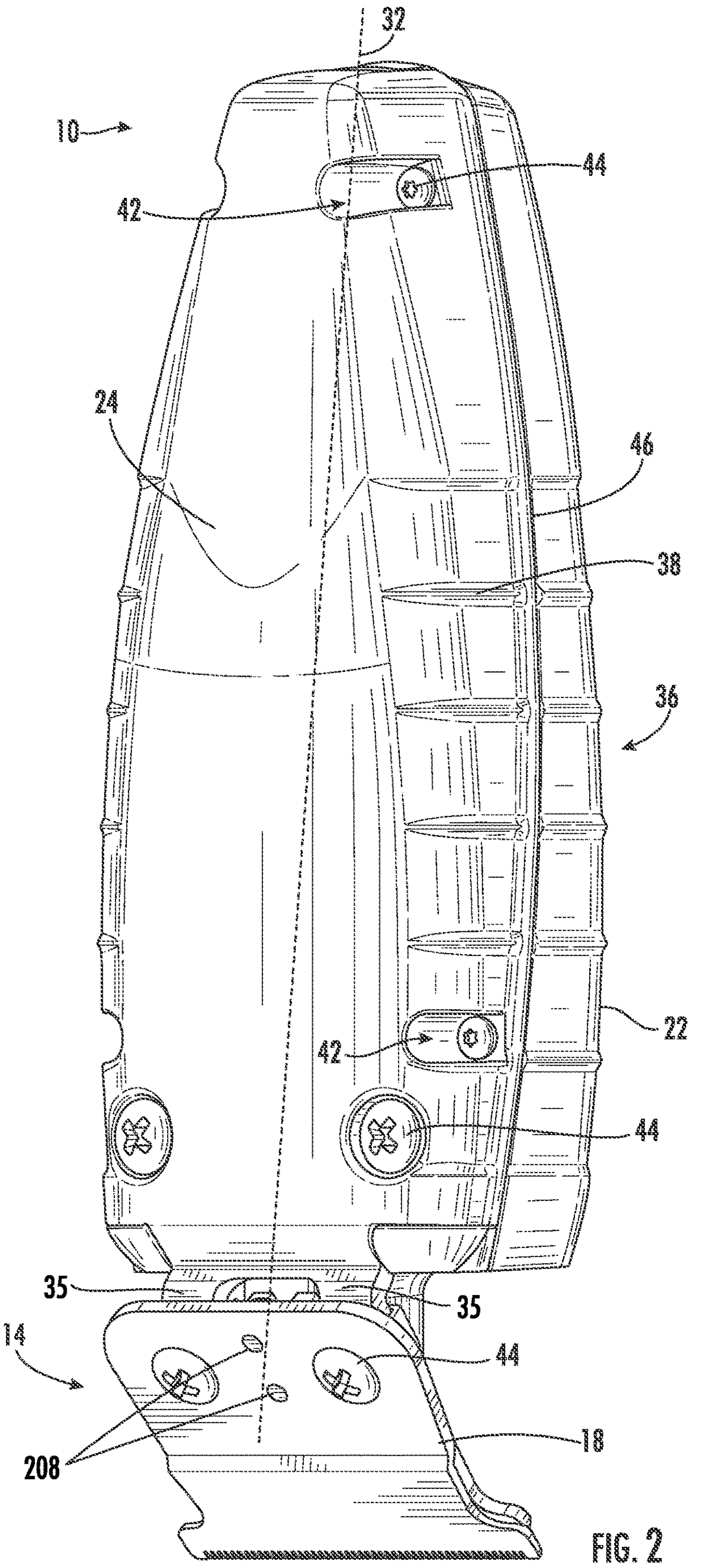
FIG. 2 is a rear perspective view of the hair clipper of FIG. 1, according to an exemplary embodiment.

Referring to FIGS. 1 and 2, various aspects of a hair trimmer, cutter, or clipper, shown as clipper 10 are shown. Clipper 10 includes a handle 12 coupled to a blade assembly 14. Blade assembly 14 includes an upper blade or cutter 16 and a lower blade 18. Upper blade 16 includes teeth 20 extending from a front edge 21 of upper blade 16. Lower blade 18 includes a plurality of lower blade teeth 15 extending from a from a front portion 17 of lower blade 18. Upper blade 16 oscillates over lower blade 18 while teeth 20 cooperate with lower blade 18 and lower blade teeth 15 to capture hair follicles and cut hair. Clipper 10 includes various components for operating clipper 10 within handle 12 (e.g. motor, circuit board, battery etc.).

Handle 12 includes an upper housing 22 coupled to a lower housing 24 extending along a longitudinal axis 32 between a first end or cutting end 26*a* second end or gripping end 28. The first end or cutting end 26 is located adjacent to the blade assembly 14 and the second end or gripping end 28 opposes the cutting end 26. Handle 12 further includes a neck 30 coupled to upper housing 22 and extending away from upper housing 22 in a direction toward blade assembly 14. Neck 30 has a generally concave shape and is configured to deflect hair and/or other debris away from the internal components of clipper 10.

In various embodiments, handle 12 is a single, continuous, and or integral component, such that upper housing 22 and lower housing 24 are permanently joined and/or fabricated as a continuous component or unitary part. In some embodiments, upper housing 22 is fabricated separately from lower housing 24 and upper housing 22 is joined or coupled to lower housing 24 at and a housing edge 46 using an attachment mechanism, shown as fasteners 44. Lower housing 24 includes one or more recesses 42 sized to receive and at least partially surround fasteners 44.

Figure 19:
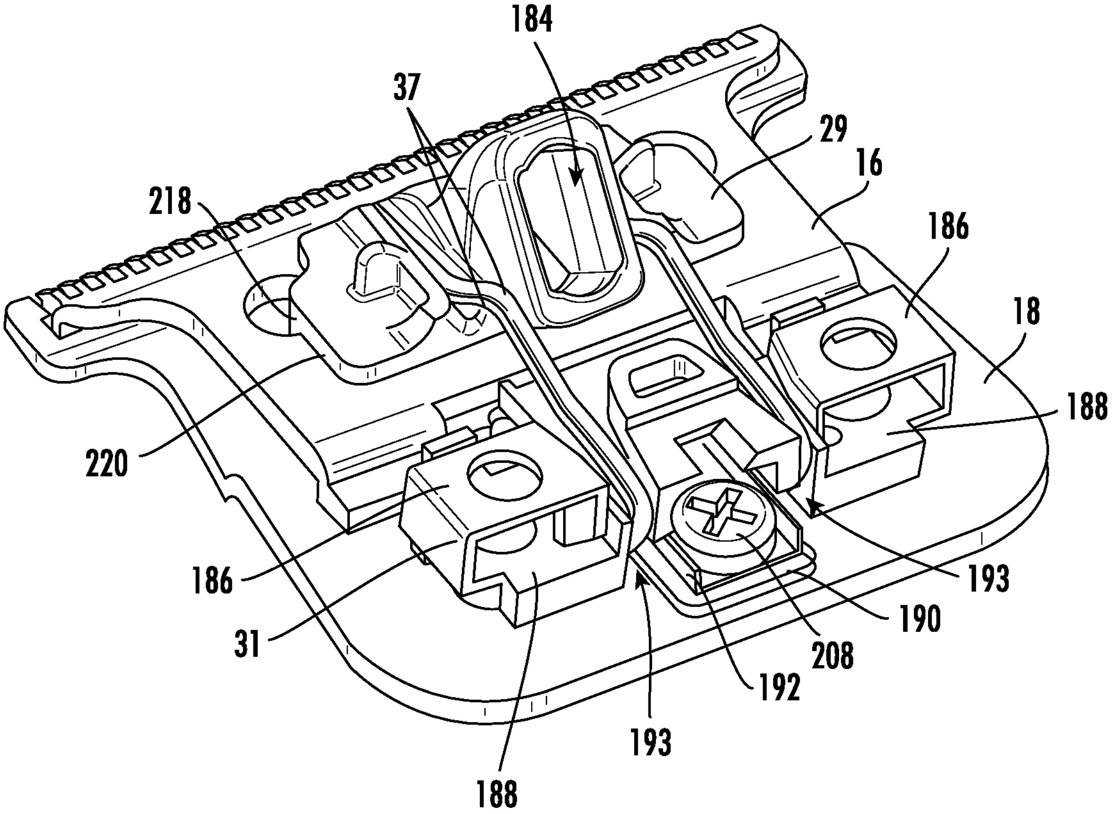
FIG. 19 is a top perspective view of the blade assembly of the hair clipper of FIG. 1, according to an exemplary embodiment.
Figure 20:
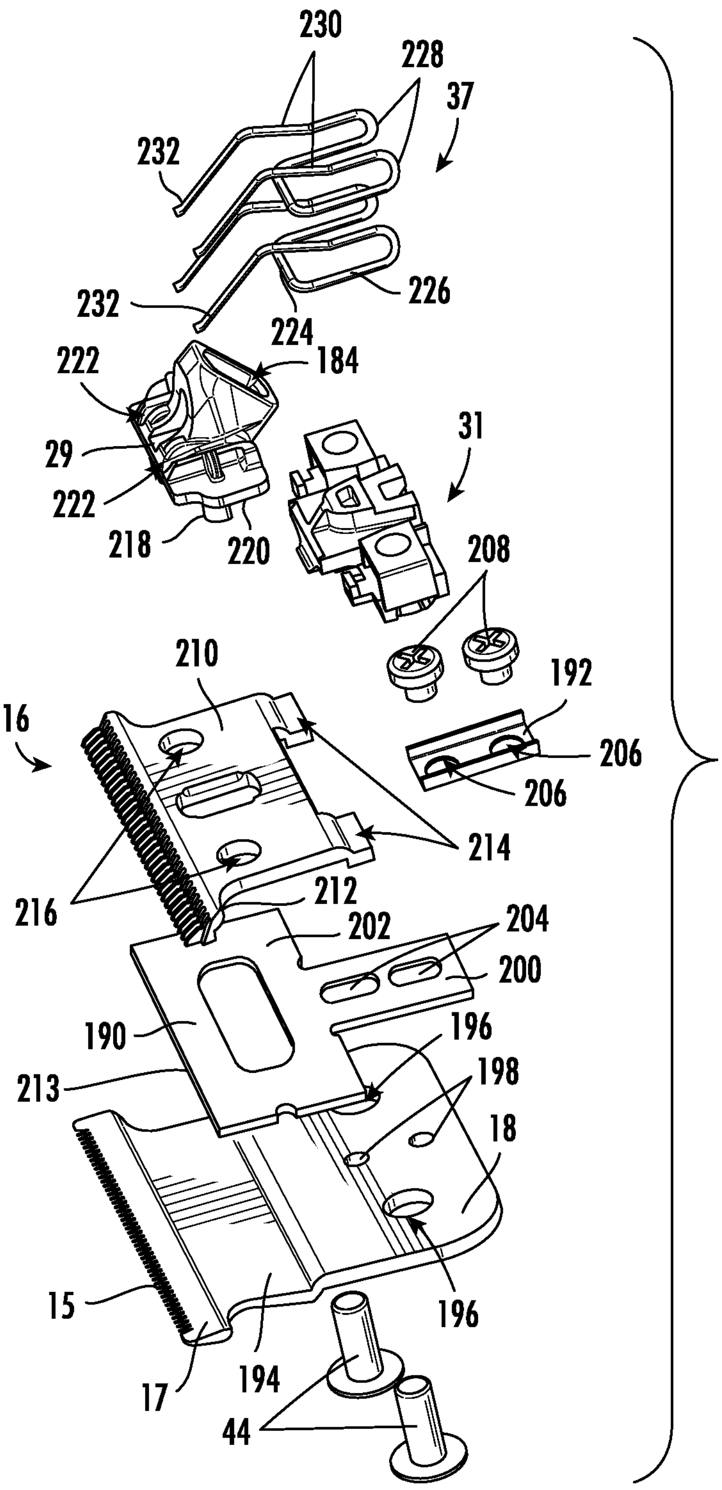
FIG. 20 is an exploded view of the blade assembly of the hair clipper of FIG. 1, according to an exemplary embodiment.
Figure 21:
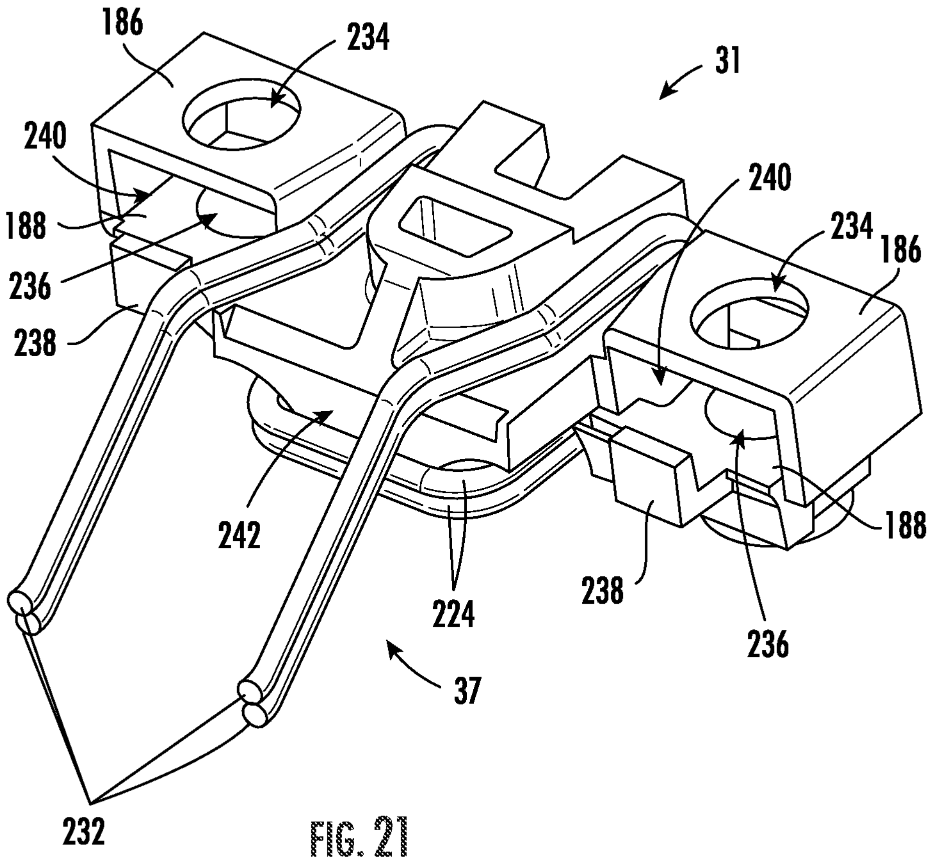
FIG. 21 is perspective view of a spring retainer of the hair clipper of FIG. 1, according to an exemplary embodiment.

Blade assembly 14 comprises upper blade or cutter 16, lower blade 18, a yoke 29, one or more biasing members, shown as springs 37, a rear guide or retainer 31, a blade guide 190 (see e.g., FIGS. 5-6), a washer 192 (see e.g., FIGS. 5-6) and a pair of blade guide fasteners 208 (see e.g., FIGS. 2 and 19-20). Lower blade 18 includes a main body 194 (see e.g., FIG. 20) and a plurality of lower blade teeth 15 extending from a front portion 17 of lower blade 18. Lower blade 18 further includes a pair of through holes 196 (see e.g., FIG. 20). Through holes 196 receive fasteners 44 to couple lower blade 18 to rear guide 31. A pair of threaded holes 198 extend through lower blade 18 and receive at least a portion of blade guide fasteners 208.

Blade assembly 14 is coupled to lower housing 24 by a housing connector 33. Housing connector 33 includes a pair of feet 35 that extend generally downward from lower housing 24 and curve forward such that feet 35 extend toward upper blade 16. At least a portion of feet 35 of housing connector 33 are received within rear guide 31 and coupled to rear guide 31 and lower blade 18 by fasteners 44.

Figure 3:
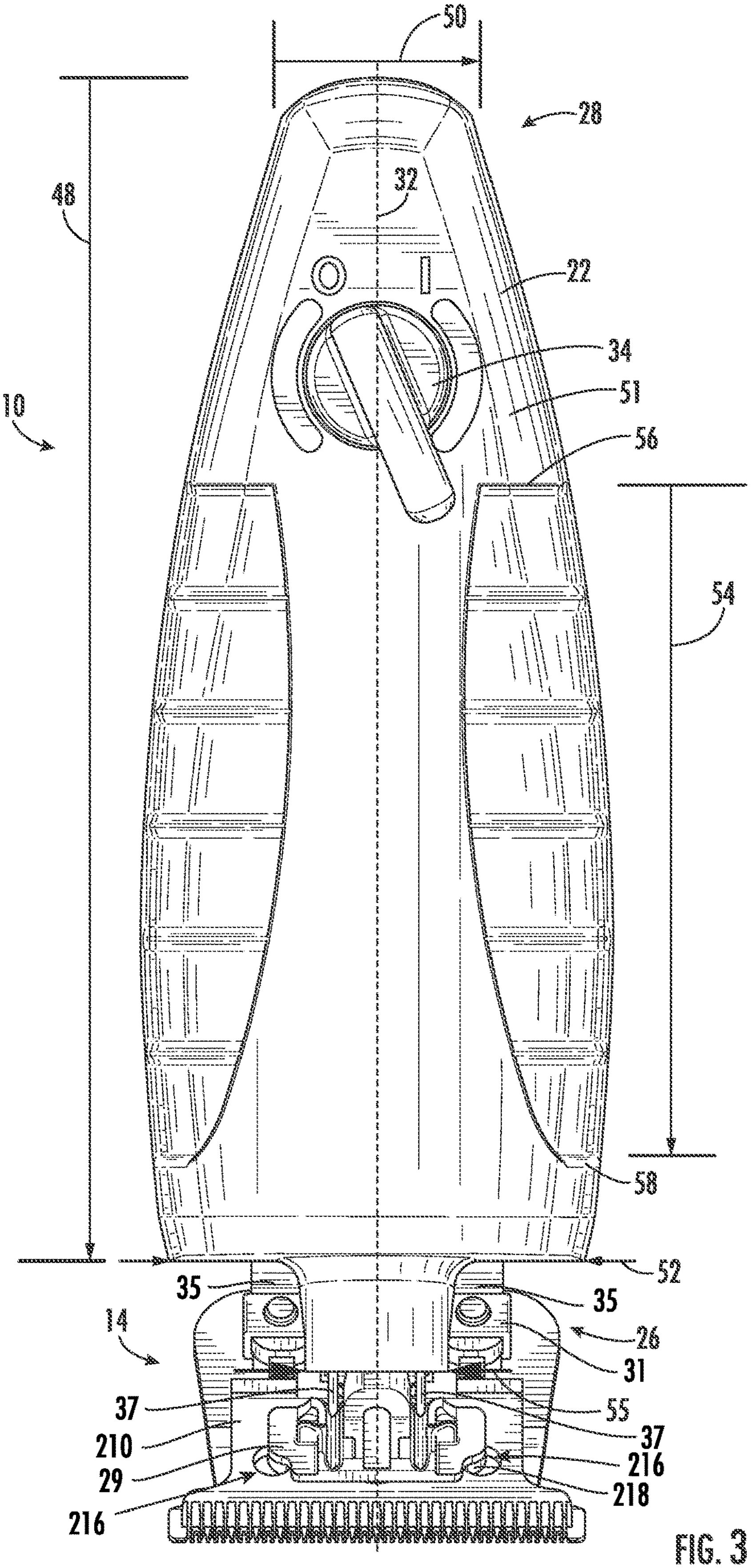
FIG. 3 is a front side view of the hair clipper of FIG. 1, according to an exemplary embodiment.
Figure 4:
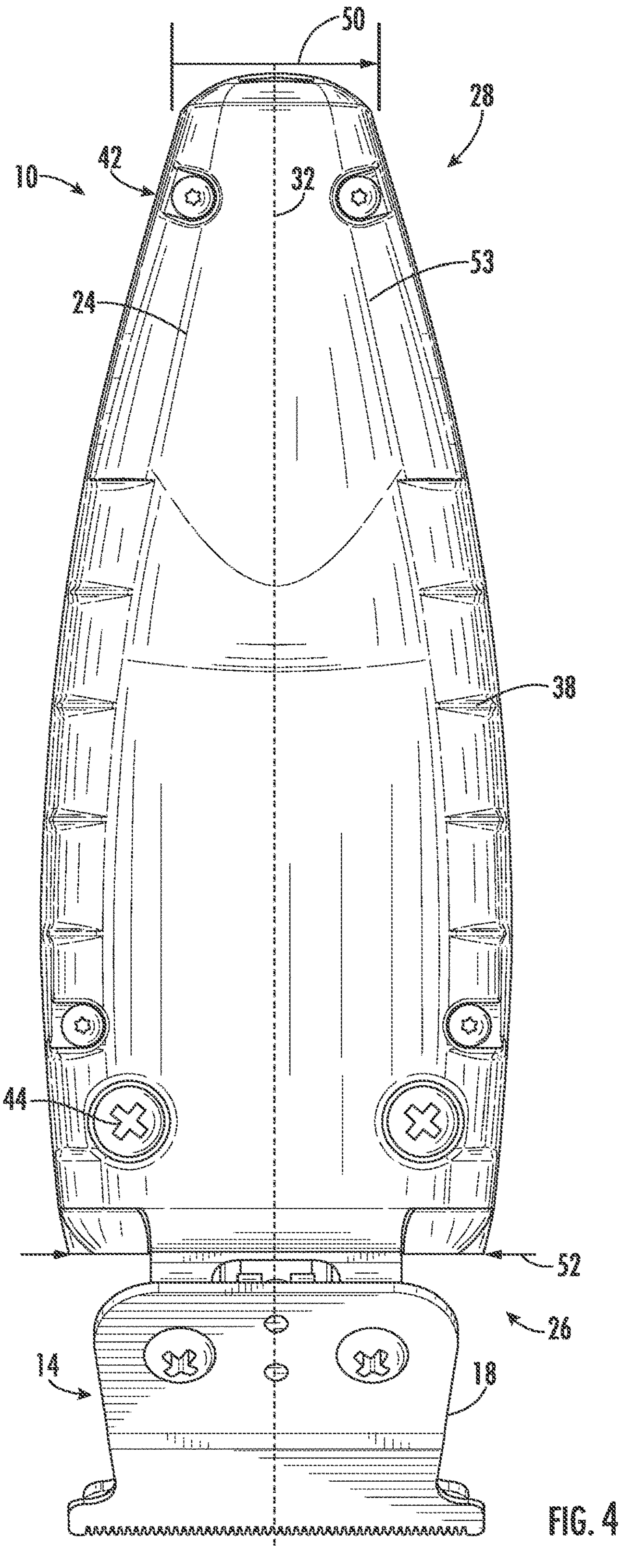
FIG. 4 is a rear side view of the hair clipper of FIG. 1, according to an exemplary embodiment.

Referring to FIGS. 2 and 3, upper housing 22 includes a power control, shown as power switch 34. The power switch 34 includes a base portion and a switch portion. Handle 12 further includes a gripping portion 36 extending across a portion of upper housing 22 and lower housing 24. Gripping portion 36 is defined by a top edge 56, a curved inner edge 40 and a bottom edge 58 and includes a plurality of ridges 38. Ridges 38 extend away from curved inner edge 40 around handle 12 towards housing edge 46 where upper housing 22 and lower housing 24 meet.

FIGS. 3-8 show various orthogonal views of clipper 10 and demonstrate relative dimensions of clipper 10. Handle 12 extends along longitudinal axis 32 between a top surface 72 and a bottom surface 74 (see e.g. FIGS. 7 and 8) of handle 12 defining a first housing length, shown as 48. A second housing length, shown as 68, extends between top surface 72 and a lower edge 66 of neck 30. In a specific embodiment, the first housing length is specifically between 88% and 98% of the second housing length, more specifically between 90% and 93% of the second housing length and in such embodiments the first housing length is about 4.5 inches (plus or minus 0.05 inches). The gripping portion 36 extends between top edge 56 and bottom edge 58 defining a gripping portion length 54. In a specific embodiment, gripping portion length 54 is between 50% and 60% of the first housing length and more specifically between 56% and 59% of the first housing length, in such embodiments gripping portion length 54 is about 2.6 inches (plus or minus 0.05 inches).

An orthogonal angle to longitudinal axis 32 defines a first housing width (e.g. between left and right sides of handle 12), shown as 50 located at the gripping end 28 and a second housing width, shown as 52 and located at the cutting end 26. In a specific embodiment, the first housing width is specifically between 45% and 55% of the second housing width, more specifically between 49% and 51% of the second housing width and in such embodiments the first housing width is about 0.75 inches (plus or minus 0.05 inches).

Figure 5:
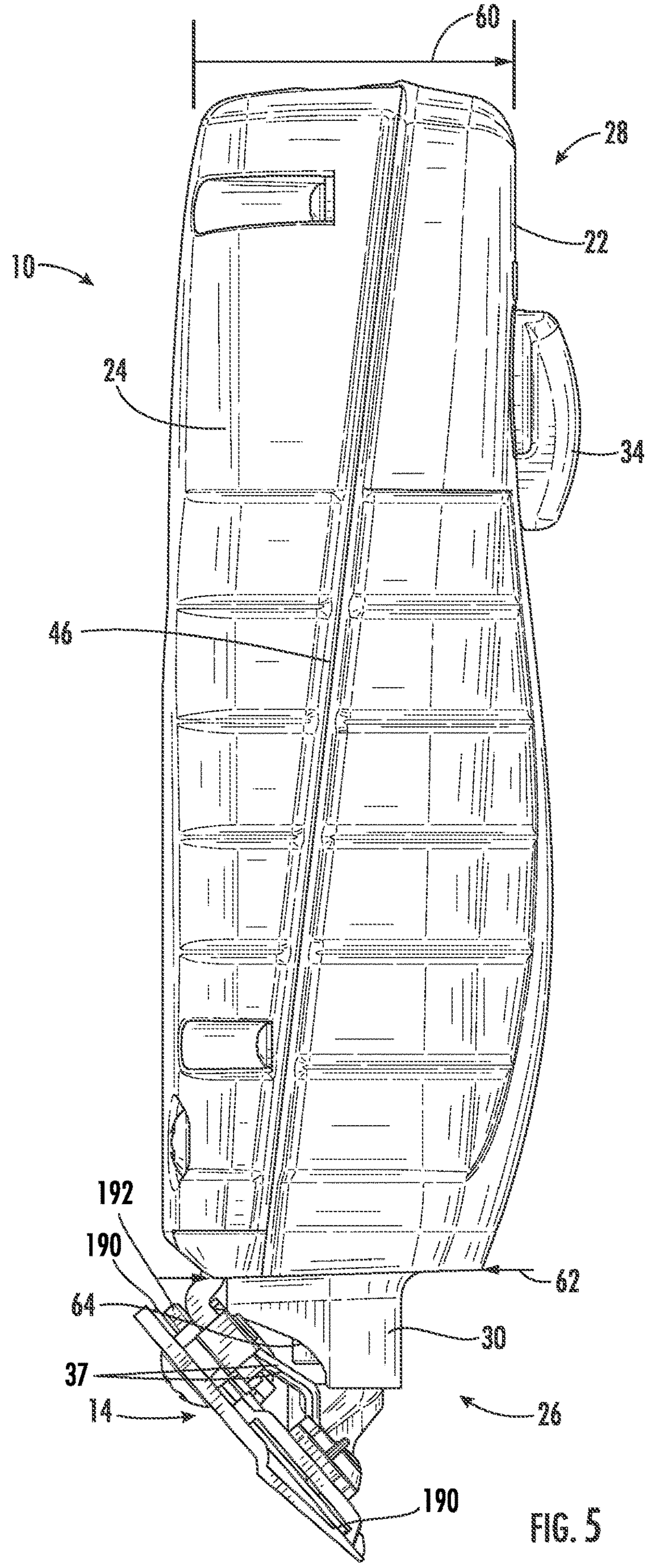
FIG. 5 is a right side view of the hair clipper of FIG. 1, according to an exemplary embodiment.
Figure 6:
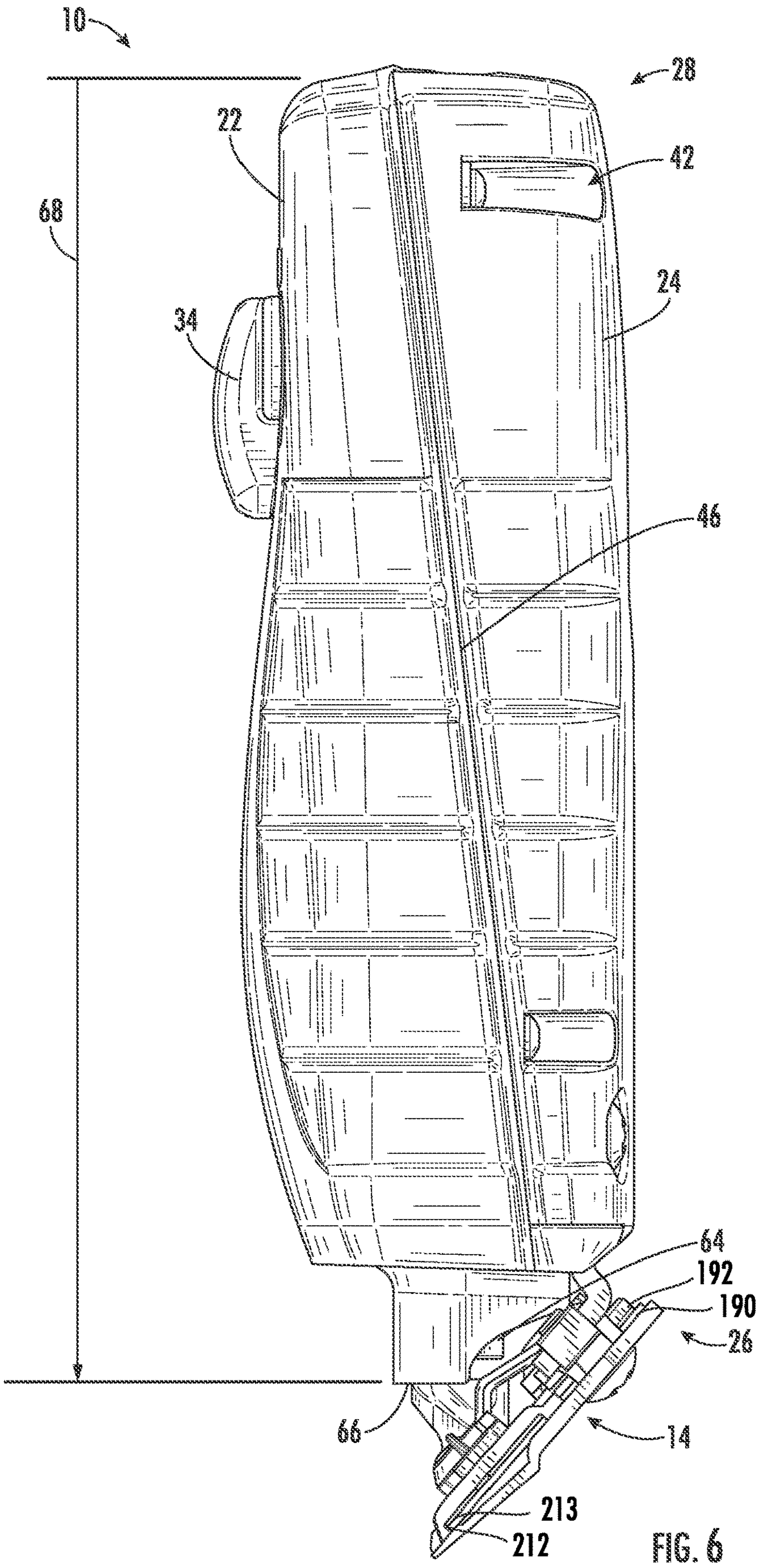
FIG. 6 is a left side view of the hair clipper of FIG. 1, according to an exemplary embodiment.

Referring to FIG. 5, a first housing height, shown as 60 is defined between a top side 51 of upper housing 22 and bottom side 53 of lower housing 24 at gripping end 28 and a second housing height, shown as 62 is located at cutting end 26. In a specific embodiment, the second housing height is specifically between 80% and 90% of the first housing height, more specifically between 85% and 90% of the first housing height and in such embodiments the second housing height is about 1.15 inches (plus or minus 0.05 inches). Referring to FIG. 6, neck 30 further includes a curved edge 64 extending away from lower edge 66 generally toward housing edge 46. A neck width 55 is defined between left and right sides of neck 30. In a specific embodiment, neck width 55 is specifically between 30% and 40% of the second housing width, more specifically between 36% and 38% of the second housing width and in such embodiments neck width 55 is about 0.555 inches (plus or minus 0.05 inches).

Figure 7:
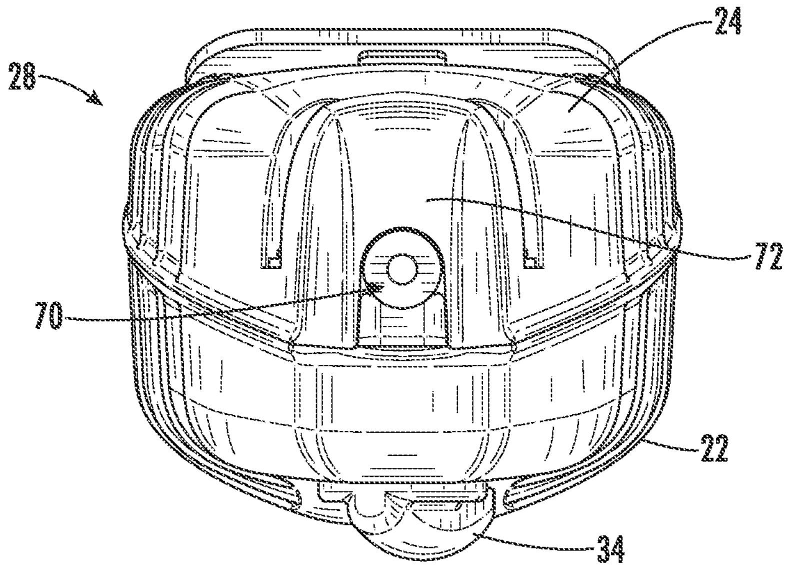
FIG. 7 is a top side view of the hair clipper of FIG. 1, according to an exemplary embodiment.
Figure 8:
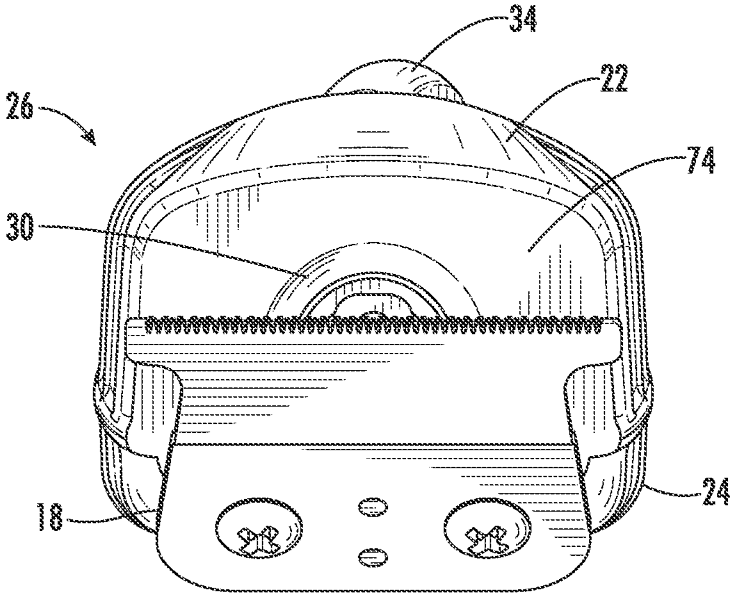
FIG. 8 is a bottom side view of the hair clipper of FIG. 1, according to an exemplary embodiment.

Referring to FIGS. 7 and 8 a top side view and bottom side view of clipper 10 are shown. In some embodiments, top surface 72 located at gripping end 28 includes an electric charging port 70. Charging port 70 extends through handle 12 and is electronically coupled to internal components of clipper 10 (e.g. a battery).

Figure 9:
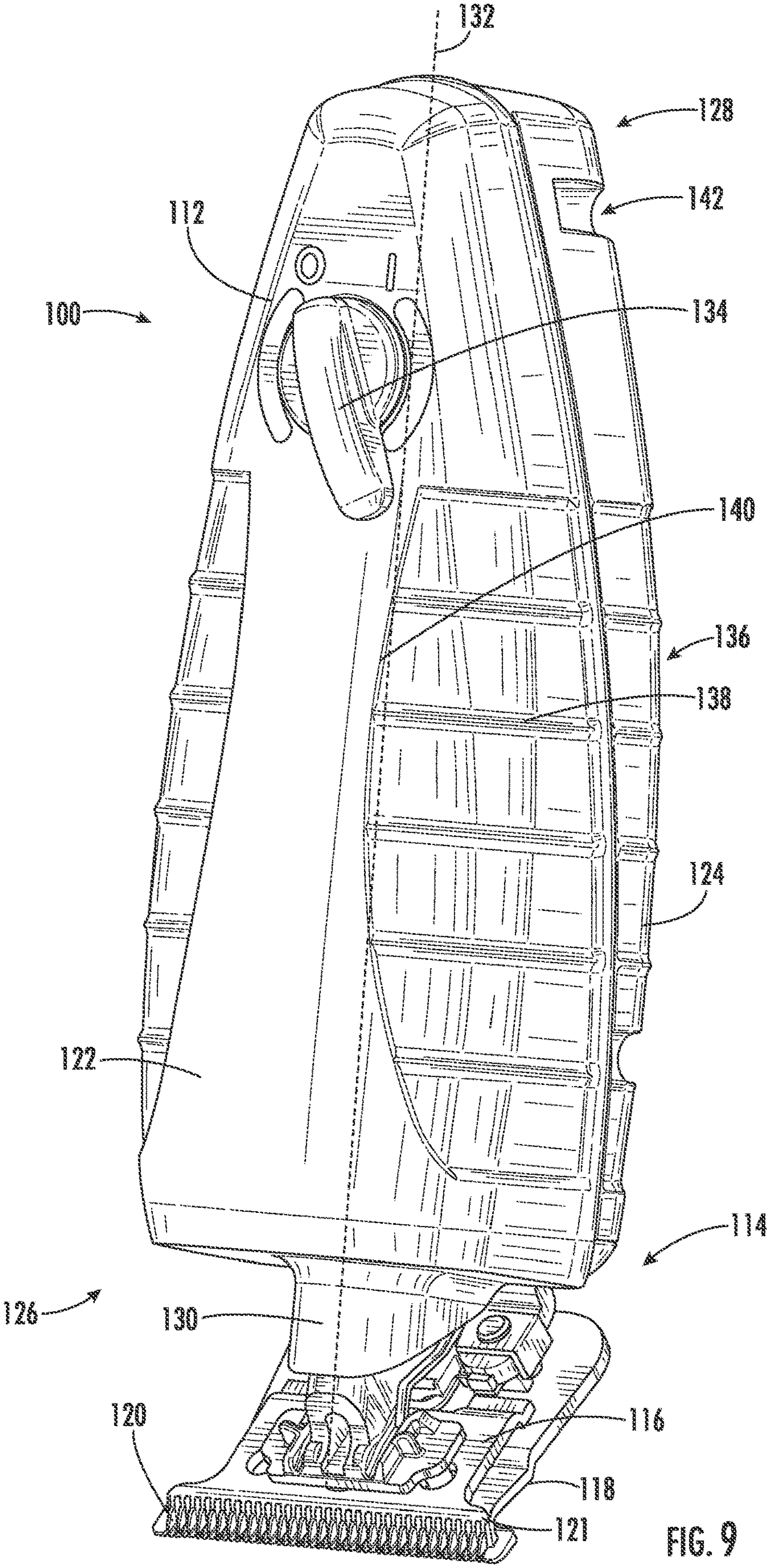
FIG. 9 is a front perspective view of a hair clipper, according to an exemplary embodiment.
Figure 10:
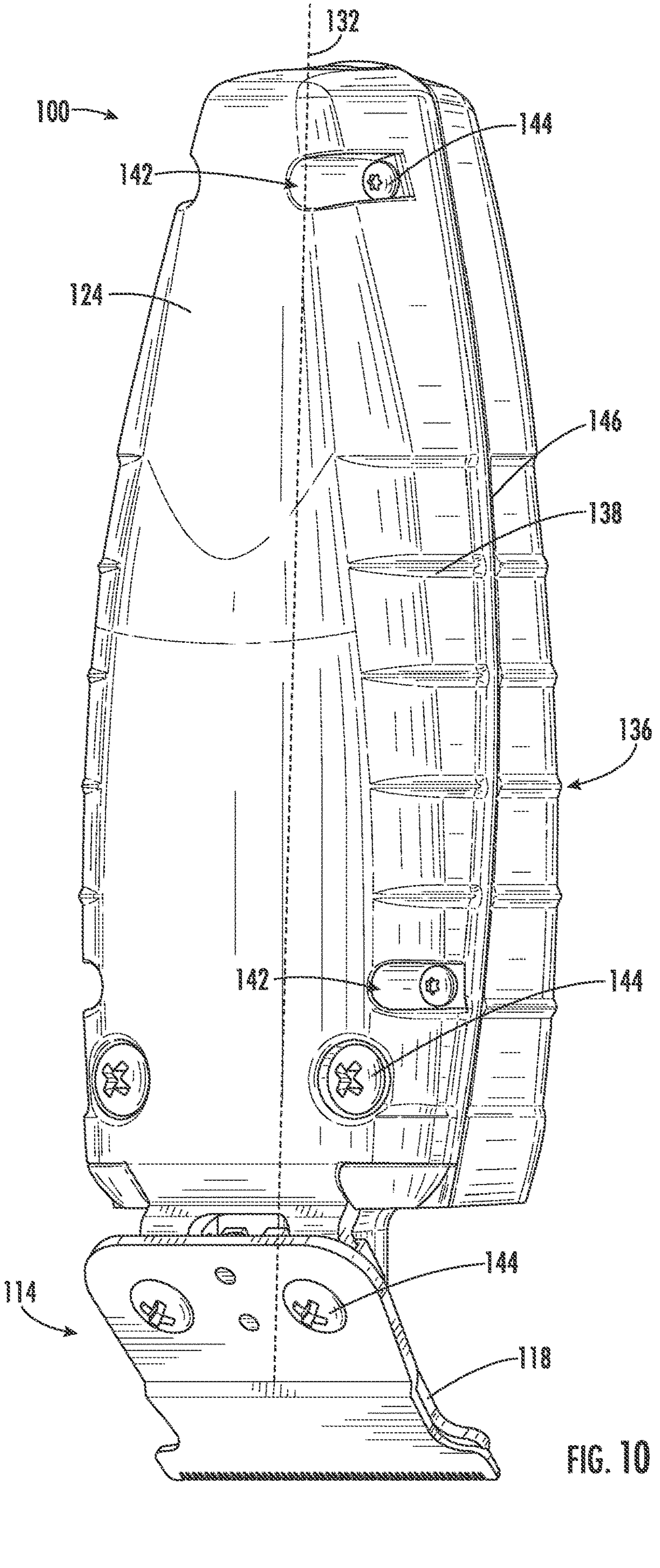
FIG. 10 is a rear perspective view of the hair clipper of FIG. 9, according to an exemplary embodiment.
Figure 11:
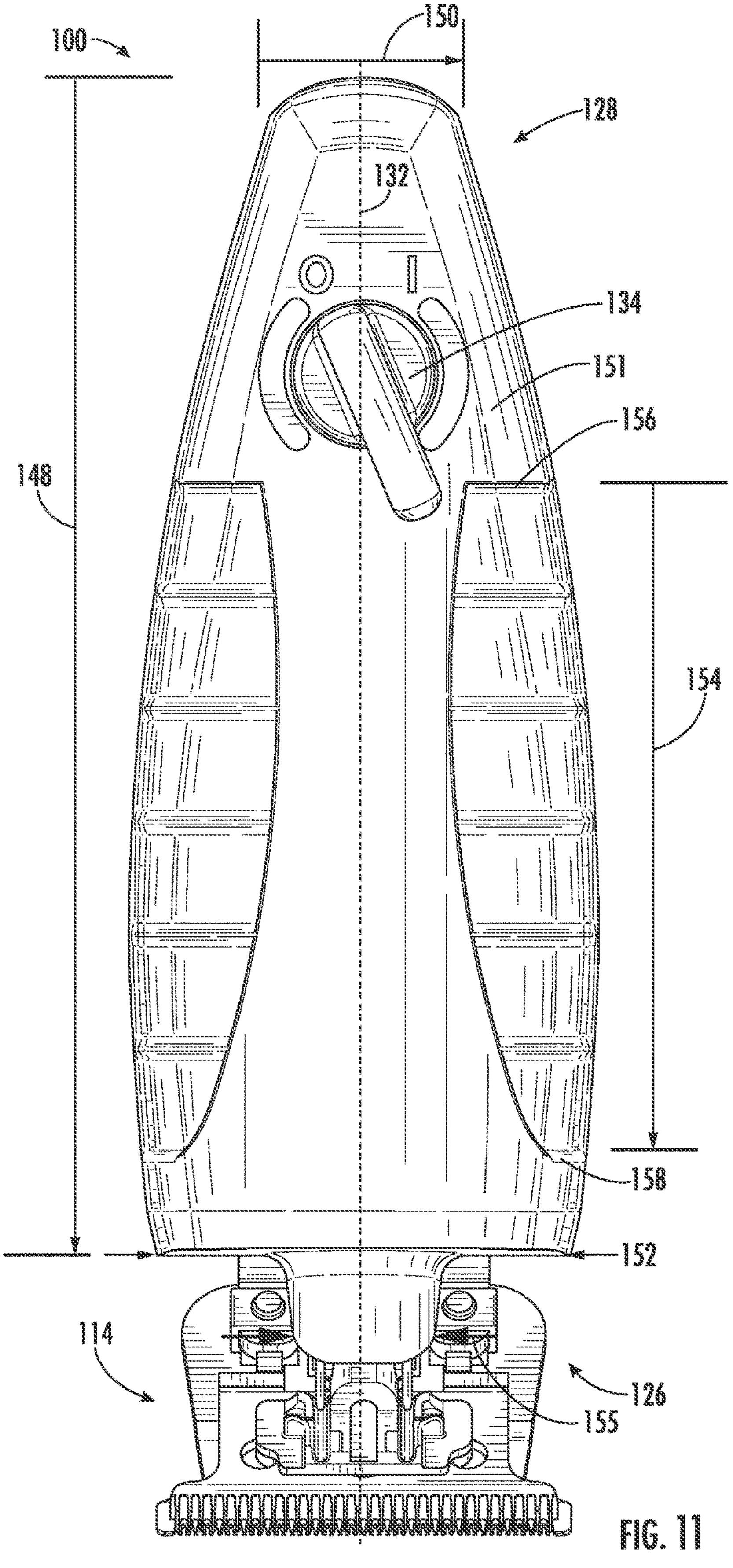
FIG. 11 is a front side view of the hair clipper of FIG. 9, according to an exemplary embodiment.
Figure 12:
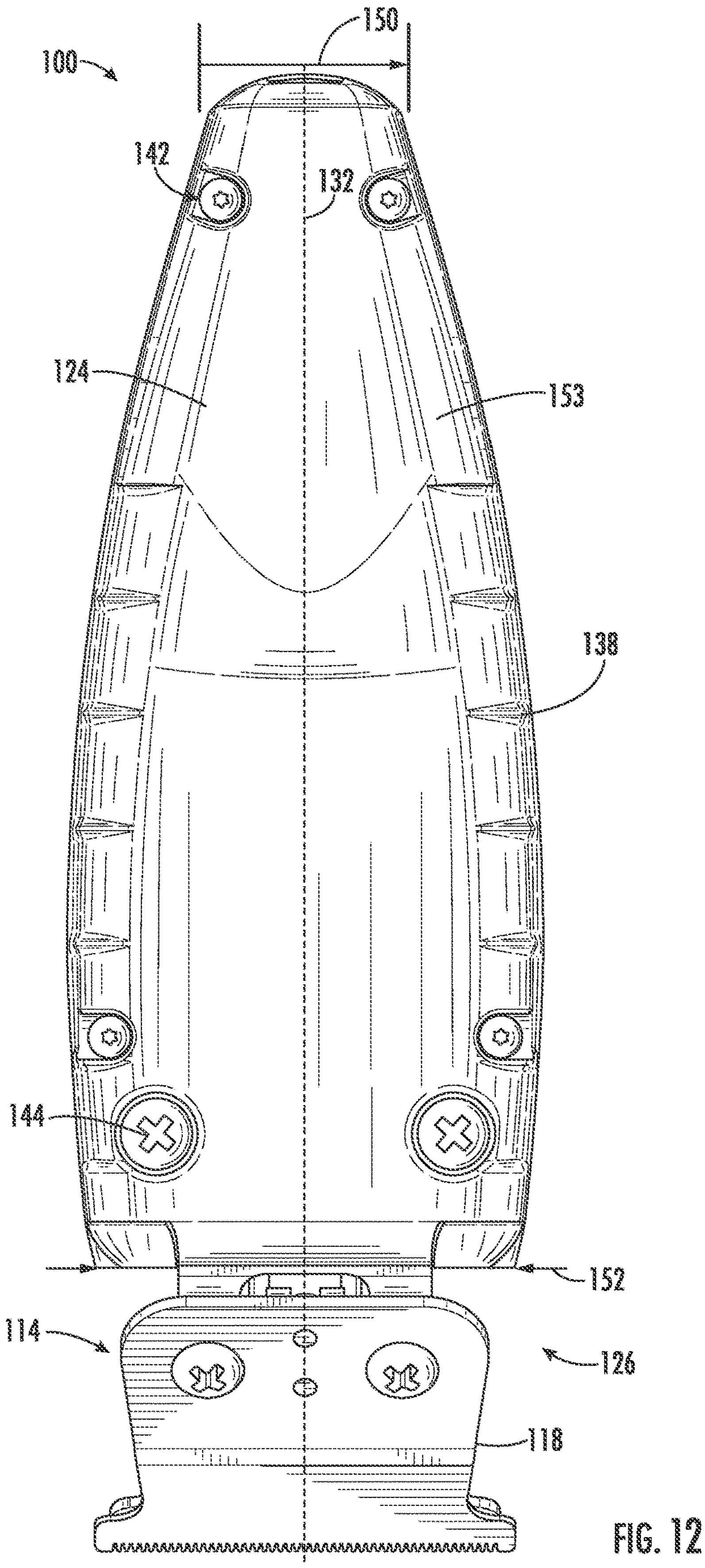
FIG. 12 is a rear side view of the hair clipper of FIG. 9, according to an exemplary embodiment.

Referring to FIGS. 9 and 10, various aspects of a hair trimmer, cutter, or clipper, shown as clipper 100 are shown. In general, clipper 100 is substantially the same as clipper 10 except for the differences discussed herein. Clipper 100 includes a handle 112 coupled to a blade assembly 114. Blade assembly 114 includes an upper blade or cutter 116 and a lower blade 118. Upper blade 116 includes teeth 120 extending from a front edge 121 of upper blade 116. Upper blade 116 oscillates over lower blade 118 while teeth 120 cooperate with lower blade 118 to capture hair follicles and cut hair.

FIGS. 11-16 show various orthogonal views of clipper 100 and demonstrate relative dimensions of clipper 100. Handle 112 extends along a longitudinal axis 132 between a top surface 172 and a bottom surface 174 (see e.g. FIGS. 15 and 16) of handle 112 defining a frist housing length, shown as 148. A second housing length, shown as 168, extends between top surface 172 and a lower edge 166 of neck 130. In a specific embodiment, the first housing length is specifically between 88% and 98% of the second housing length, more specifically between 90% and 93% of the second housing length and in such embodiments the first housing length is about 4.5 inches (plus or minus 0.05 inches). The gripping portion 36 extends between top edge 156 and bottom edge 158 defining a gripping portion length 154. In a specific embodiment, gripping portion length 154 is between 50% and 60% of the second housing length and more specifically between 56% and 59% of the second housing length, in such embodiments gripping portion length 154 is about 2.6 inches (plus or minus 0.05 inches).

An orthogonal angle to longitudinal axis 132 defines a first housing width (e.g. between left and right sides of handle 112), shown as 150 located at the gripping end 128 and a second housing width, shown as 152 and located at the cutting end 126. In a specific embodiment, the first housing width is specifically between 45% and 55% of the second housing width, more specifically between 49% and 51% of the second housing width and in such embodiments the first housing width is about 0.75 inches (plus or minus 0.05 inches).

Figure 13:
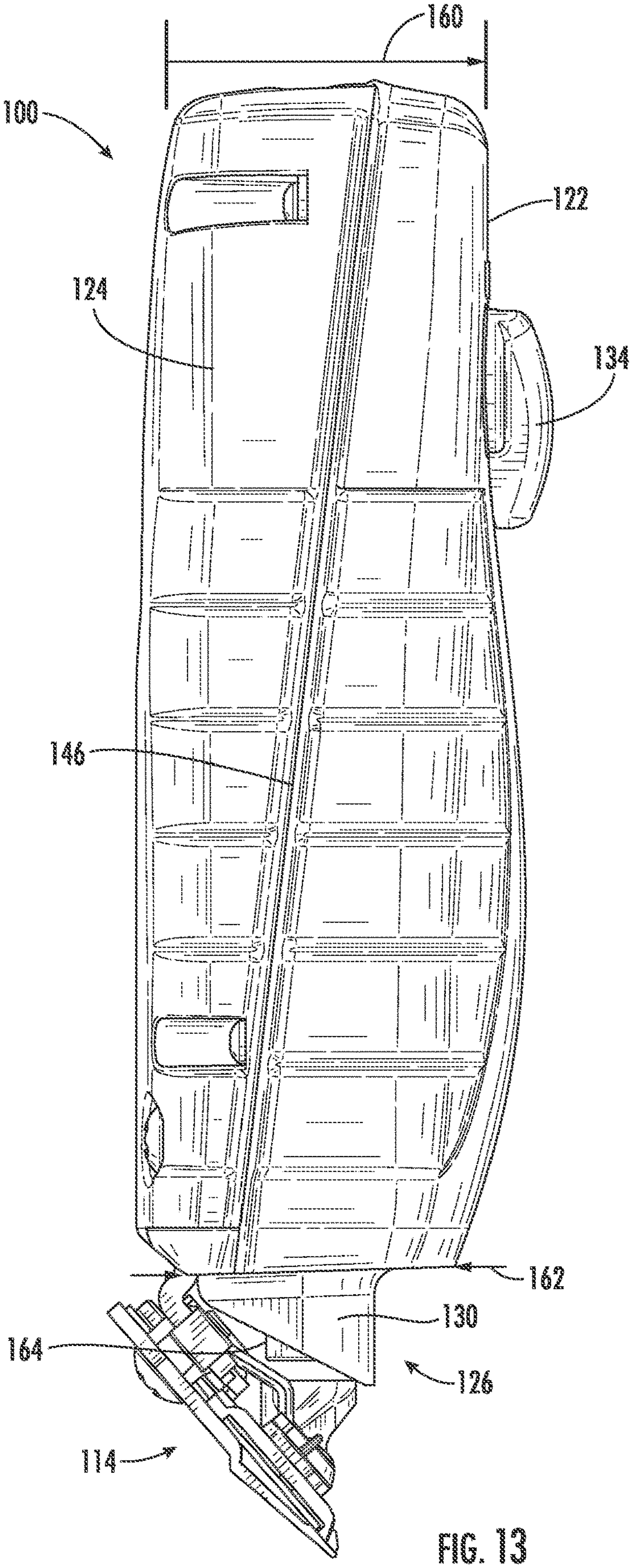
FIG. 13 is a right side view of the hair clipper of FIG. 9, according to an exemplary embodiment.
Figure 14:
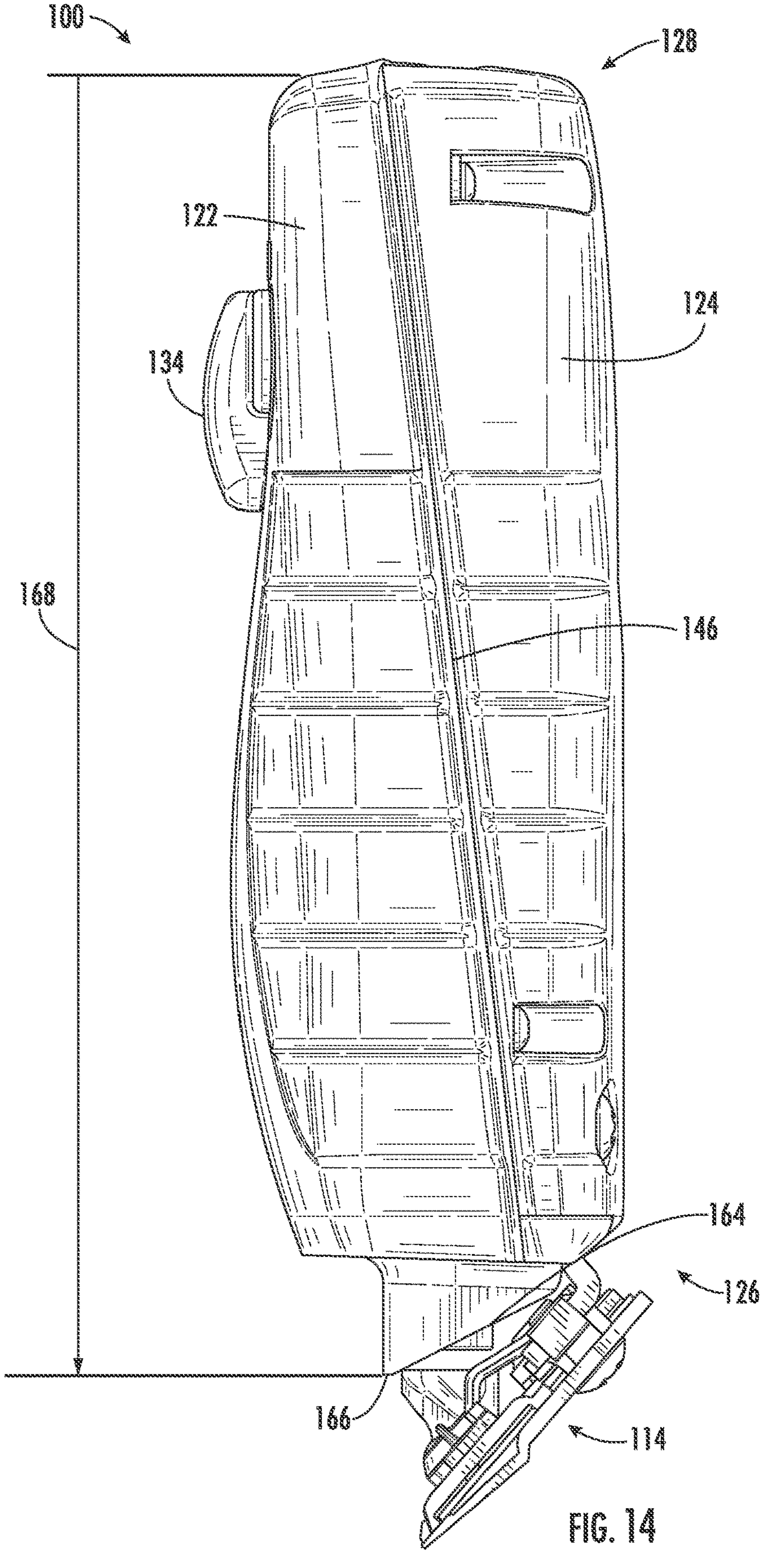
FIG. 14 is a left side view of the hair clipper of FIG. 9, according to an exemplary embodiment.

Referring to FIG. 13, a first housing height, shown as 160 is defined between a top side 151 of upper housing 122 and bottom side 153 of lower housing 124 at gripping end 128 and a second housing height, shown as 162 is located at cutting end 126. In a specific embodiment, the second housing is specifically between 80% and 90% of the first housing height, more specifically between 85% and 90% of the first housing height and in such embodiments the second housing height is about 1.15 inches (plus or minus 0.05 inches). Referring to FIG. 14, neck 130 further includes an edge 164 extending at an angle away from lower edge 166 generally toward housing edge 146. A neck width 155 is defined between left and right sides of neck 130. In a specific embodiment, neck width 155 is specifically between 30% and 40% of the second housing width, more specifically between 36% and 38% of the second housing width and in such embodiments neck width 155 is about 0.555 inches (plus or minus 0.05 inches).

Figure 15:
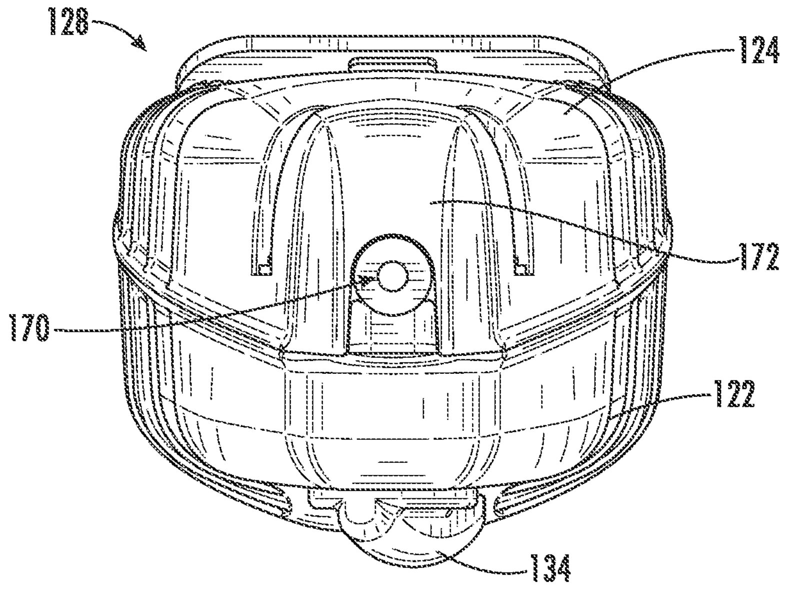
FIG. 15 is a top side view of the hair clipper of FIG. 9, according to an exemplary embodiment.
Figure 16:
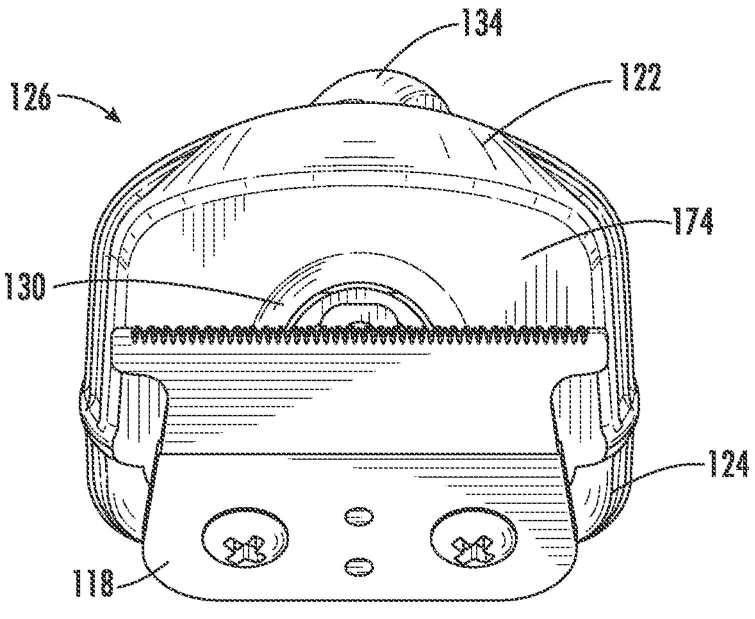
FIG. 16 is a bottom side view of the hair clipper of FIG. 9, according to an exemplary embodiment.

Referring to FIGS. 15 and 16 a top side view and bottom side view of clipper 100 are shown. In some embodiments, top surface 172 located at gripping end 128 includes a charging port 170. Charging port 170 extends through handle 12 and is electronically coupled to internal components of clipper 100 (e.g., a battery).

Referring to FIGS. 17-22, detailed views of blade assembly 14 are shown. Upper blade 16 includes a main body 210. Upper blade 16 is positioned proximate lower blade 18 with front edge 21 positioned in a parallel orientation to and offset from front portion 17 of lower blade 18.

Figure 17:
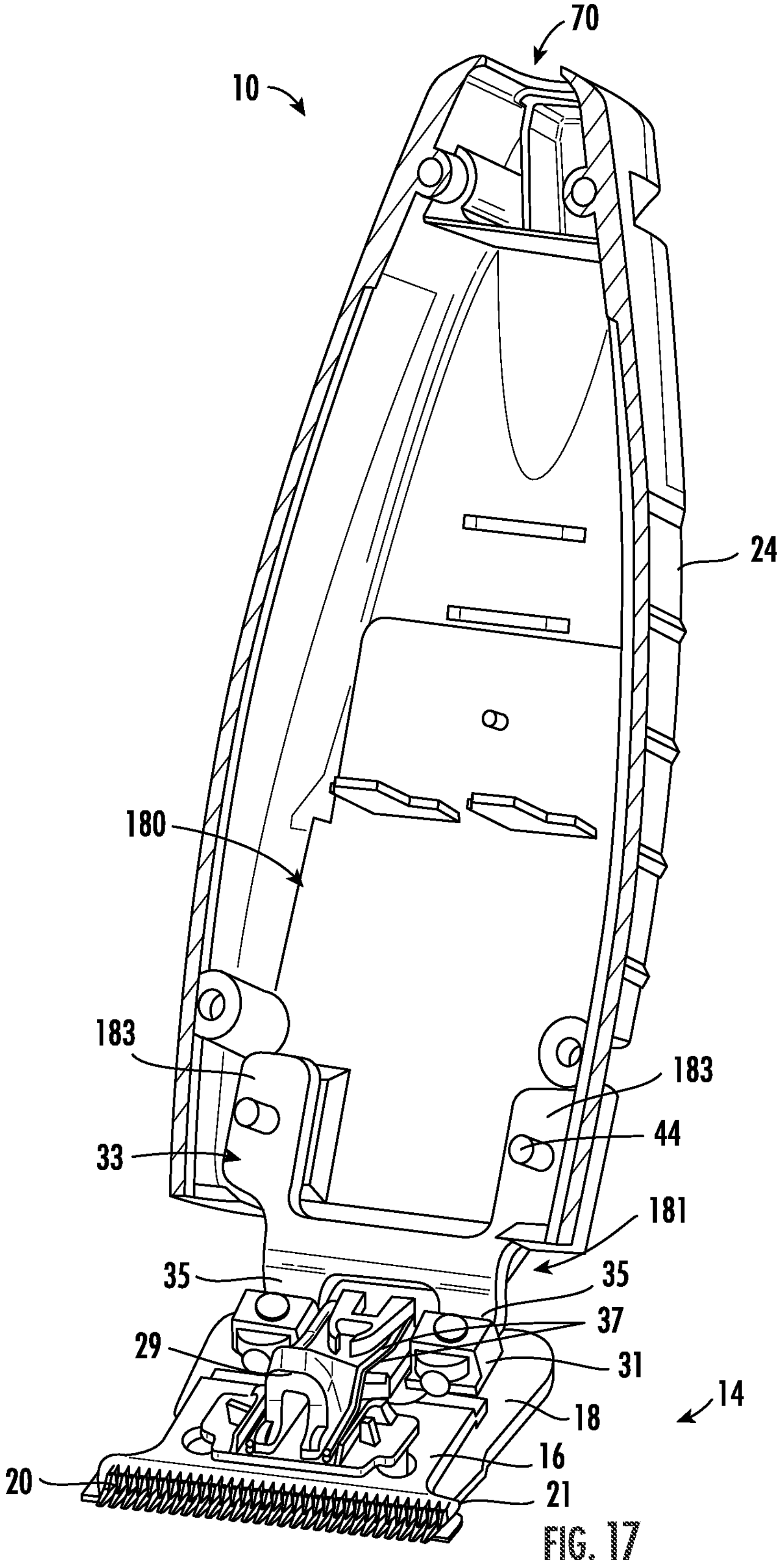
FIG. 17 is a front perspective view of the hair clipper of FIG. 1 with an upper portion of the housing and internal clipper components remove, according to an exemplary embodiment.
Figure 18:
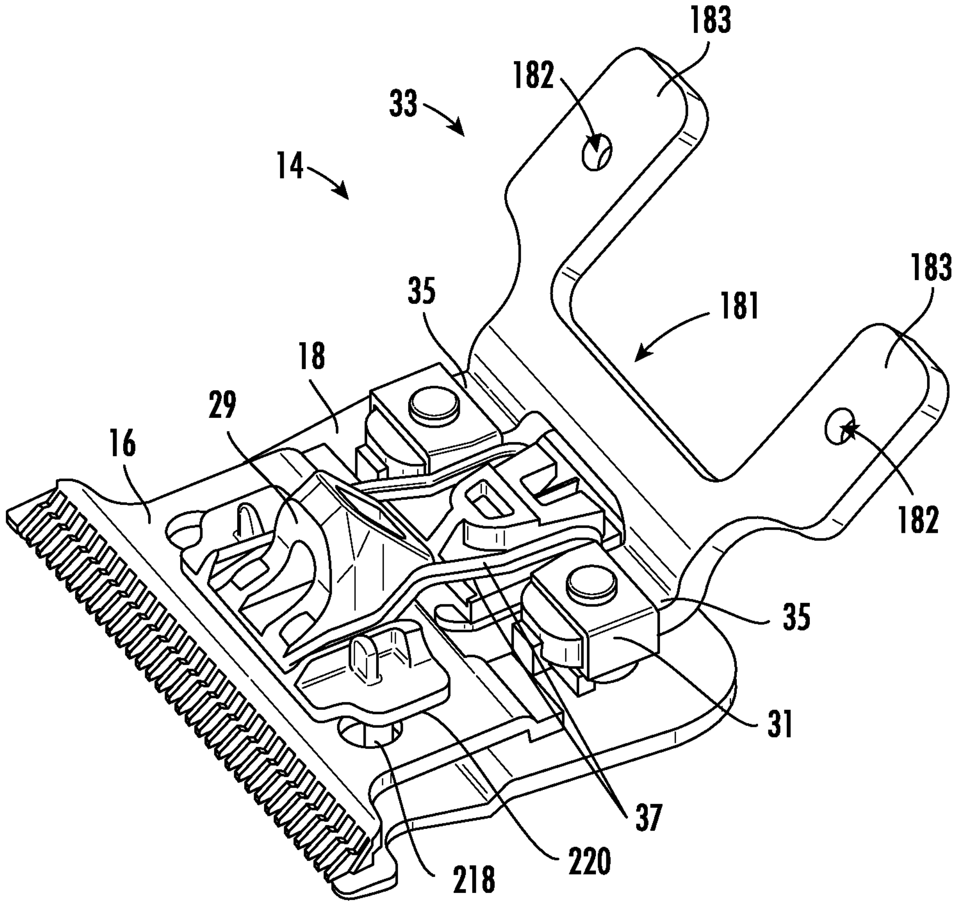
FIG. 18 is a perspective view of a blade assembly a housing connector of the hair clipper of FIG. 1, according to an exemplary embodiment.

Referring to FIGS. 17-18, details of housing connector 33 and the coupling between blade assembly 14 and lower housing 24 are shown. An upper portion 181 of housing connector 33 is positioned above feet 35 and extends within a cavity 180 of lower housing 24. Cavity 180 is configured to receive the internal components of clipper 10 (e.g., a motor, drive mechanism etc.). Upper portion 181 of housing connector 33 includes a pair of arms 183 extending upward toward lower housing 24 and away from blade assembly 14. Each arm 183 of housing connector 33 includes a through hole 182 configured to a receive an end of a fastener 44 to couple housing connector 33 to lower housing 24. Upper portion 181 and arms 183 form a generally U-shape leaving space within cavity 180 for internal components such as a the motor and drive mechanism to extend toward blade assembly 14.

Blade guide 190 is a generally T-shaped piece mounted to lower blade 18. Blade guide 190 comprises a guide base portion 200 and a cross portion 202. Guide base portion 200 includes slots 204 extending parallel to the major axis of the guide base portion 200 and perpendicular to the major axis of cross portion 202. Cross portion 202 includes a front guide edge 213 parallel to front portion 17 of lower blade 18. Blade guide 190 performs at least two functions: guiding reciprocating movement of upper blade 16 with front guide edge 213 and retaining one or more springs 37 against body 194 of lower blade 18 with guide base portion 200.

Washer 192 interfaces against guide base portion 200. Washer 192 includes slots 206 that align with slots 204 of guide base portion 200. Blade guide fasteners 208 extend through both slots 206 and slots 204 in washer 192 and guide base portion 200 respectively and then are threadably received into threaded holes 198 in body 194 of lower blade 18.

A depending guide surface 212 is on a bottom of upper blade 16 and is parallel to front edge 21. Depending guide surface 212 engages a front guide edge 213 (see e.g., FIG. 6). Front guide edge 213 engages depending guide surface 212 and restricts movement of upper blade 16 perpendicular to front portion 17 of lower blade 18. This engagement maintains a blade gap between parallel front edge 21 of upper blade 16 and front portion 17 of lower blade 18. The blade gap defines an offset between front edge 21 and front portion 17 and does not refer to a vertical separation. Blade guide 190 serves at least the purpose of maintaining a constant blade gap and fixing at least a portion of springs 37 with respect to lower blade 18. In a specific embodiment, the spring bases 224 of springs 37 are fixed with respect to lower blade 18.

Feet 214 protrude from main body 210 of upper blade 16 and straddle guide base portion 200. Feet 214 are disposed on body 194 of lower blade 18 when blade assembly 14 is fully assembled creating a vertical gap between upper and lower blades 16, 18. The distance and/or space between feet 214 allows upper blade 16 to reciprocate with respect to lower blade 18 and blade guide 190 without causing feet 214 to hit guide base portion 200.

Yoke 29 is positioned above upper blade 16 (from perspective of FIG. 3). Pegs 218 protrude from lower surface 220 of yoke 29 and are inserted into holes 216 of body 210 of upper blade 16 to couple yoke 29 to upper blade 16. Yoke 29 further includes a receiver 184 configured to receive and couple to a portion of the drive mechanism of the clipper (e.g., an eccentric drive). Yoke 29 includes channels or grooves 222 positioned on opposing sides of receiver 184 (see e.g., FIGS. 1 and 18).

In one embodiment, each spring 37 comprises a generally U-shaped spring base 224, a pair of securing arms 226 that extend generally parallel to each other from the spring base 224, and a pair of fixed ends 228 opposite a pair of free ends 232 along each arm 230. In a specific embodiment, each spring arm 230 is angled. In a specific embodiment, fixed ends 228 are arcuate shaped. Free ends 232 interface against channels 222 of yoke 29 to bias yoke 29 against upper blade 16. Springs 37 apply a downward biasing force on the yoke 29 and an upward biasing force on the lower blade 18 to draw the yoke 29 and lower blade 18 toward each other. These biasing forces of the springs 37 sandwich the upper blade 16 between the yoke 29 and lower blade 18. The springs 37 may be characterized as tension springs because when the blade assembly 14 is assembled, the spring arms 230 and the spring base 224 are separated from each other in a wider position than their at rest position or relationship. As such, the springs 37 are attempting to draw or pull the spring arms 230 and the spring base 224 back to the at rest position.

Rear guide 31 includes a pair of channels 193 positioned on opposing sides of washer 192. Fixed ends 228 of springs 37 are disposed within respective channels 193 of rear guide 31 (see e.g., FIG. 19). Channels 193 include channel arcs 237 around which fixed ends 228 are disposed and curved surfaces 239 against which securing arms 226 are disposed, securing springs 37 laterally within channels 193. Spring bases 224 are biased against a protrusion or tongue 242. Tongue 242 both secures springs 37 against rear guide 31 and biases free ends 232 of springs 37 against upper blade 16.

Rear guide 31 further includes a pair of side members 186. Each side member 186 includes a bore or through hole 234. Through holes 234 are configured to receive at least a portion of fasteners 44 that extend through lower blade 18 and couple lower blade 18 to rear guide 31. Side members 186 include a lower surface 188 positioned below though holes 234 with an opening or space 240 defined within each side member 186. A pair of bores or through holes 236 are defined within each lower surface 188. The pair of through holes 236 are aligned with and positioned below the corresponding through holes 234. Through holes 236 are positioned such that fasteners 44 extend between both through holes 236 and through holes 234 and across space 240 when lower blade 18 is coupled to rear guide 31.

When the blade assembly 14 is coupled to lower housing 24, feet 25 of housing connector 33 are received within rear guide 31 and extend into space 240. Opening or space 240 is sized to receive the feet 35 of the housing connector 33. A front portion of each foot 35 is prevented from moving further forward (e.g., toward upper blade 16) by a projection or tab 238 extending from each side member 186 and specifically from lower surfaces 188. In a specific embodiment, each tab 238 has an L-shape. Each foot 35 includes a hole similar to through holes 182 that can be aligned with though holes 234 and 236 of rear guide 31. When housing connector 33 is coupled to rear guide 31 all the through holes 234, 236 are aligned such that an end of fastener 44 can extend through lower blade 18, rear guide 31 and feet 35 of housing connector 33.

Figure 22:
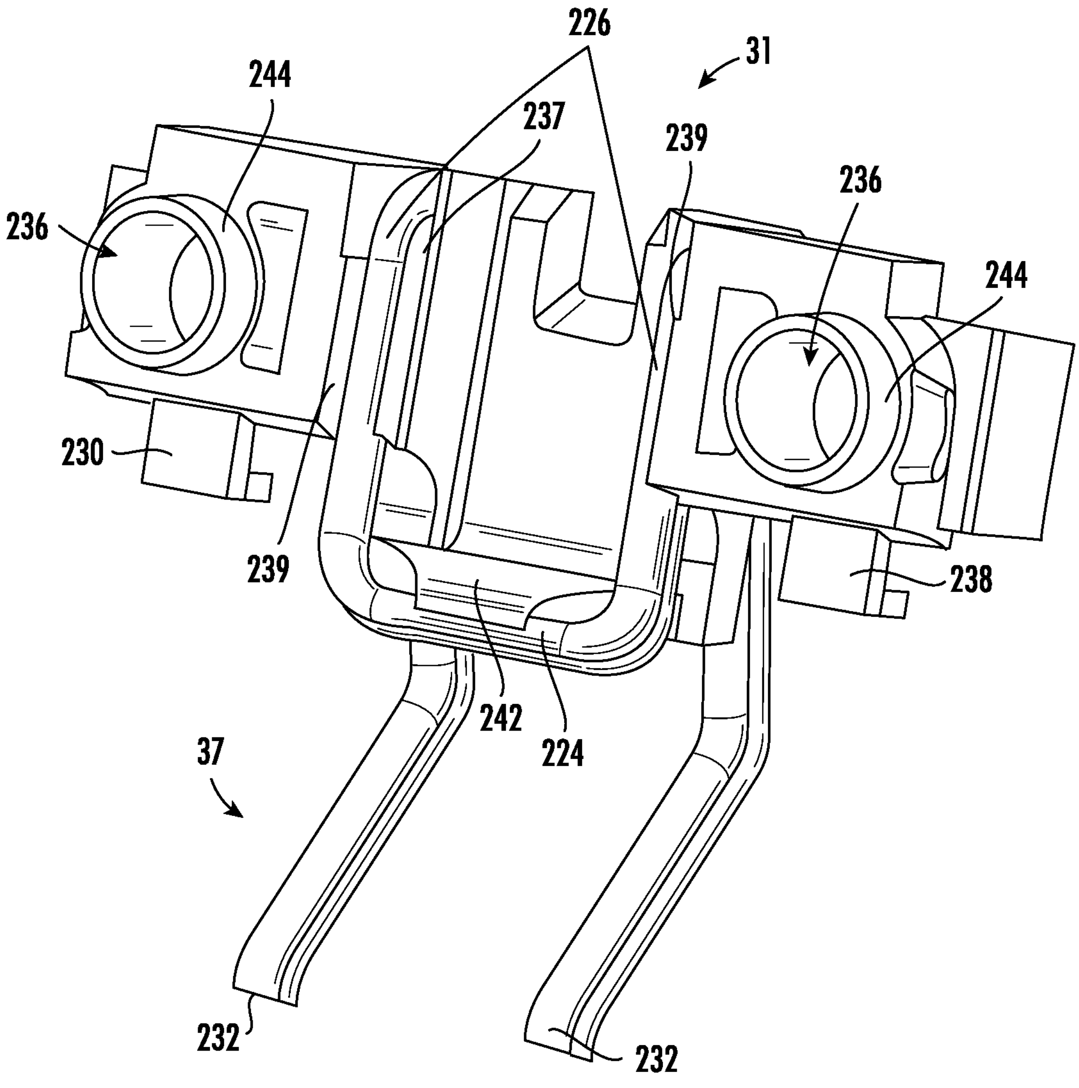
FIG. 22 is perspective view of a spring retainer of the hair clipper of FIG. 1, according to an exemplary embodiment.

Referring to FIG. 22, a perspective view of rear guide 31 and springs 37 from below (relative to FIGS. 1 and 17) is shown. Rear guide 31 and specifically side members 186 further include hollow cylinders 244 extending downward toward lower blade 18 and at least partially defining though holes 234. Tongue 242 protrudes such that springs 37 are held in position when blade assembly 14 is assembled. In a specific embodiment, two springs 37 are stacked. In other embodiments a plurality of springs may be stacked (e.g., three, four etc.).

In one embodiment, fully assembled blade assembly 14 with stacked springs 37 positioned on yoke 29 and rear guide 31, blade guide 190 positioned between upper blade 16 and lower blade 18 and rear guide 31 coupled to washer 192, blade guide 190 and/or lower blade 18 by blade guide fasteners 208 that extend through threaded holes 198. Springs 37 and specifically spring arms 230 apply a biasing force (downward from the perspective of FIGS. 1 and 17) on upper blade 16. The biasing force of springs 37 sandwiches blade guide 190 between upper blade 16 and lower blade 18. Springs 37 function as tension springs because free ends 232 exert the tension of arms 230 against upper blade 16.

The placement or positioning of blade guide fasteners 208 in slots 206 and slots 204 allow for a range of positions for blade guide 190. The position of blade guide 190 with respect to lower blade 18 allows for a range of widths of possible blade gaps. Blade guide 190 may be moved toward front portion 17 of lower blade 18 until one of the blade guide fasteners 208 is disposed against an end of either slot 204 or slot 206, at which point blade guide 190 is prevented from moving further. The position of blade guide 190 with respect to lower blade 18 is adjustable by loosening blade guide fasteners 208, moving blade guide 190 with the previously described range, and tightening blade guide fasteners 208 when a desired position or blade gap has been reached. When blade guide 190 is adjusted to a forward limit, the blade gap is minimized and when blade guide 190 is adjusted to the rear limit, the blade gap is maximized. The blade gap determines the length to which clipper 10 will cut hair, with a smaller blade gap corresponding to a shorter length of hair. When blade guide fasteners 208 are tightened down against the washer 192 and blade guide 190, the spring base 224 is trapped against and fixed with respect to the lower blade 18 (see e.g., FIG. 1).

When the drive member of clipper 10 engages with receiver 184 of yoke 29, yoke 29 and upper blade 16 reciprocate with respect to lower blade 18. Lower blade 18 is held stationary with respect to lower housing 24 through fasteners 44 coupling feet 35 of housing connector 33 and rear guide 31 to lower housing 24. When yoke 29 and upper blade 16 reciprocate with respect to lower blade 18, spring base 224 is fixed with respect to lower blade 18 by virtue of being coupled to rear guide 31. Spring arms 230 of springs 37 have a length sufficient to accommodate a range of reciprocating motion of upper blade 16 and yoke 29 with respect to lower blade 18. In various embodiments, no compliance coils in spring base 224 or spring arms 230 are required to accommodate the reciprocation of upper blade 16 with respect to lower blade 18.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting. For example, when the term "hair" is used in the detailed description and claims, it should be understood to also include "fur", which is known as the "hair" of certain animals, and whisker/beards which are known as facial "hair".

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Various embodiments of the invention relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A blade assembly, comprising:
- a stationary blade having teeth extending along a front portion of the stationary blade;
- a cutting blade having cutting teeth extending along an edge parallel to the front portion of the stationary blade, and supported relative to the stationary blade such that the cutting teeth are moveable over the stationary blade to cut hair;
- a yoke coupled to the cutting blade;
- a blade guide at least partially positioned between the stationary blade and the cutting blade;
- a plurality of biasing members, each biasing member comprising:
  - a plurality of free ends that interface against the yoke;
  - a plurality of angled biasing arms extending from the plurality of free ends;
  - a plurality of fixed ends extending from the plurality of angled biasing arms, wherein the plurality of fixed ends are aligned with each other;
  - a plurality of securing arms extending from each of the fixed ends; and
  - a base extending between the plurality of securing arms; and
- a retainer positioned behind the cutting blade and coupled to the stationary blade, and engaged by the plurality of biasing members such that the base of each of the biasing members is trapped against the stationary blade, the retainer comprising:
- a pair of opposing side members; and
- a protrusion positioned between the pair of opposing side members, the protrusion extending outward from a front wall of the retainer and away from the stationary blade, wherein the protrusion comprises a curved surface facing away from the stationary blade, and wherein the protrusion interfaces against the biasing members.

2. The blade assembly claim 1, wherein the yoke includes a pair of channels configured to interface with the plurality of free ends of the biasing members to bias the yoke against the cutting blade.

3. The blade assembly of claim 1, wherein the plurality of angled biasing arms apply a downward force on the cutting blade, and wherein the plurality of angled biasing arms are aligned with each other.

4. The blade assembly of claim 1, wherein each of the side members includes an opening facing the yoke and through holes to receive a fastener.

5. The blade assembly of claim 4, wherein the plurality of angled biasing arms at least partially extend around the retainer and are positioned between the pair of opposing side members.

6. The blade assembly of claim 4, wherein each side member includes an opening extending through the side member and sized to receive a portion of a housing connector.

7. The blade assembly of claim 1, the blade guide further comprising:
- a guide base portion coupled to the stationary blade; and
- a cross portion having an orientation perpendicular to the guide base portion, wherein the cross portion is positioned between the stationary blade and the cutting blade.

8. The blade assembly of claim 7, wherein the cutting blade includes a pair of feet and the guide base portion of the blade guide extends between the pair of feet.

9. The blade assembly of claim 8, wherein in response to the cutting blade moving relative to the stationary blade, the pair of feet slide along a portion of the stationary blade.

10. A blade assembly, comprising:
- a lower blade having teeth extending along a front portion of the lower blade;
- an upper blade having cutting teeth extending along an upper blade edge parallel to the front portion of the lower blade and supported relative to the lower blade such that the cutting teeth are moveable over the lower blade to cut hair;
- a yoke coupled to the upper blade;
- a blade guide at least partially positioned between the lower blade and the upper blade;
- a plurality of springs, the plurality of springs stacked, each spring comprising:
  - a plurality of free ends that interface against the yoke;
  - a plurality of angled spring arms extending from the plurality of free ends in a first direction, wherein each of the plurality of angled spring arms are aligned in the first direction;
  - a plurality of fixed ends extending from the plurality of angled spring arms;
  - a plurality of securing arms extending from each of the fixed ends; and
  - a spring base extending between the plurality of securing arms; and
- a retainer positioned behind the upper blade and coupled to the lower blade, the retainer engaged by the plurality of springs such that the spring bases of the plurality of springs are trapped against the lower blade.

11. The blade assembly claim 10, wherein the yoke includes a receiver and a pair of grooves positioned on opposing side of the receiver, the pair of grooves configured to interface with the plurality of free ends of the plurality of springs to bias the yoke against the upper blade.

12. The blade assembly of claim 10, wherein the plurality of angled spring arms apply a force on the upper blade.

13. The blade assembly of claim 10, wherein the retainer includes a pair of opposing side members and wherein each side member includes a pair of through holes to receive a fastener.

14. The blade assembly of claim 13, wherein the plurality of angled spring arms at least partially extend around the retainer and are positioned between the pair of opposing side members.

15. The blade assembly of claim 13, wherein each side member includes a tab extending outward from the retainer and an opening extending through the side member from a front wall to a rear wall of the retainer, the opening sized to receive a portion of a housing connector.

16. The blade assembly of claim 15, wherein the tab of each side member is L-shaped preventing forward movement of the portion of the housing connector received within the openings of the side members.

17. The blade assembly of claim 10, the blade guide further comprising:
- a guide base portion coupled to the lower blade; and a cross portion having an orientation perpendicular to the guide base portion, wherein the cross portion is positioned between the lower blade and the upper blade.

18. A blade assembly, comprising:

a lower blade having teeth extending along a front portion of the lower blade;

an upper blade having teeth extending along an upper blade edge parallel to the front portion of the lower blade and supported relative to the lower blade such that the upper blade is moveable over the lower blade;

a yoke coupled to the upper blade;

a blade guide at least partially positioned between the lower blade and the upper blade;

a plurality of springs, each spring comprising:

two free ends that interface against the yoke;

two angled spring arms extending from the two free ends;

two fixed ends extending from the two angled spring arms, the two fixed ends stacked and aligned with each other such that one of the fixed ends is positioned between the other fixed end and the lower blade;

two securing arms extending from the two fixed ends; and a spring base extending between the two securing arms; and a retainer positioned behind the upper blade and coupled to the lower blade, the retainer engaged by the plurality of springs such that the spring bases of the plurality of springs are trapped against the lower blade.

19. The blade assembly claim 18, wherein the yoke includes a receiver and a pair of grooves positioned on opposing side of the receiver, the pair of grooves configured to interface with the two free ends of each of the plurality of springs to bias the yoke against the upper blade and wherein the two angled spring arms of each of the plurality of springs apply a force on the upper blade.

20. The blade assembly of claim 18, wherein the retainer includes a pair of opposing side members, each side member including a tab extending outward from a front of the retainer and an opening extending through the side member and sized to receive a portion of a housing connector and wherein the tab of each side member is L-shaped preventing forward movement of the portion of the housing connector received within the opening of each side member.

21. The blade assembly of claim 10, wherein the retainer further comprises a protrusion, and wherein the protrusion further comprises a curved surface facing away from the lower blade and engaging the spring base.

* * * * *